United States Patent Office 3,130,180
Patented Apr. 21, 1964

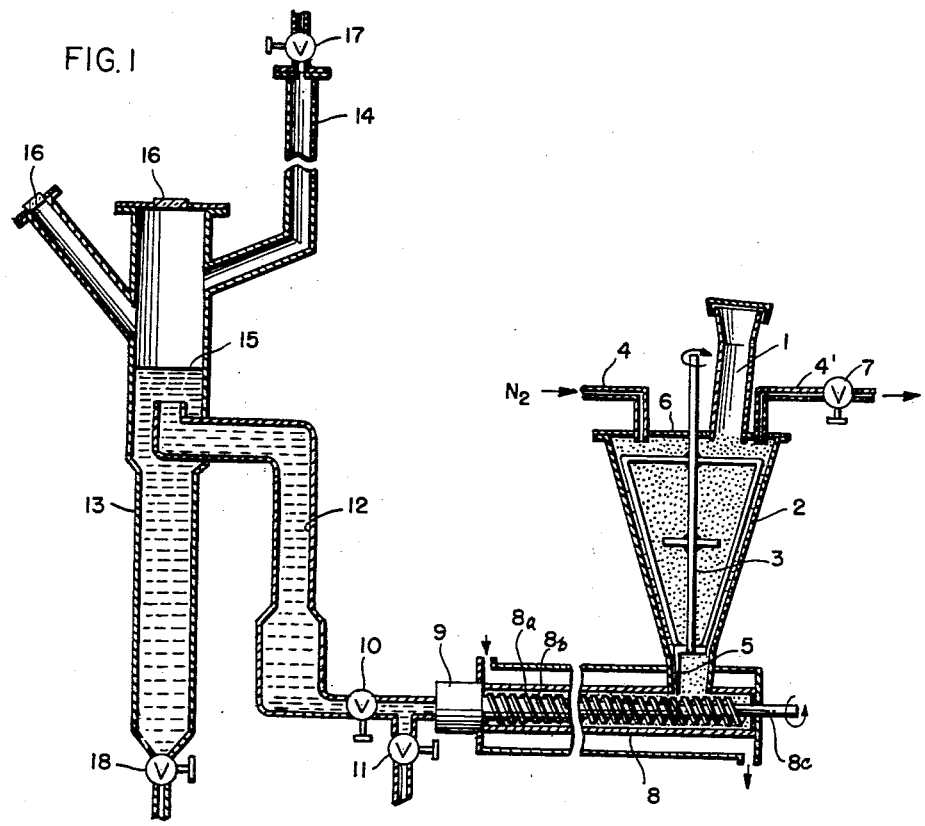
FIG. 1
FIG. 2
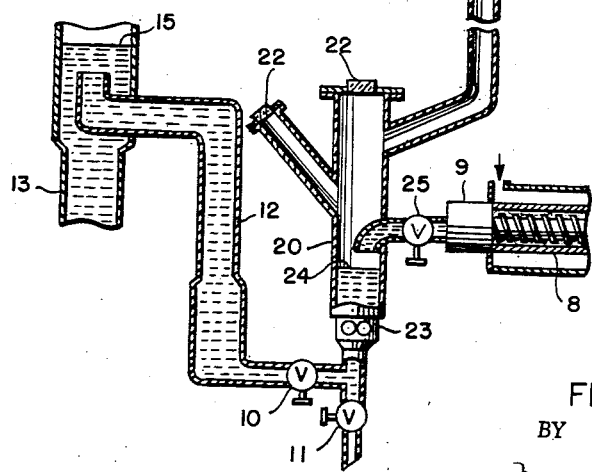
INVENTOR:
FRITZ WILOTH

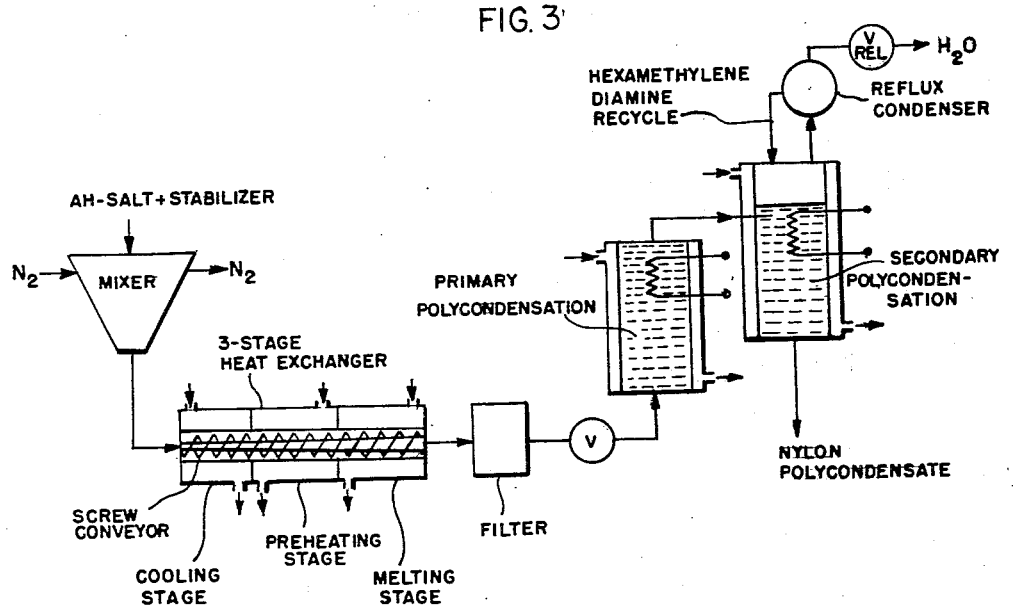
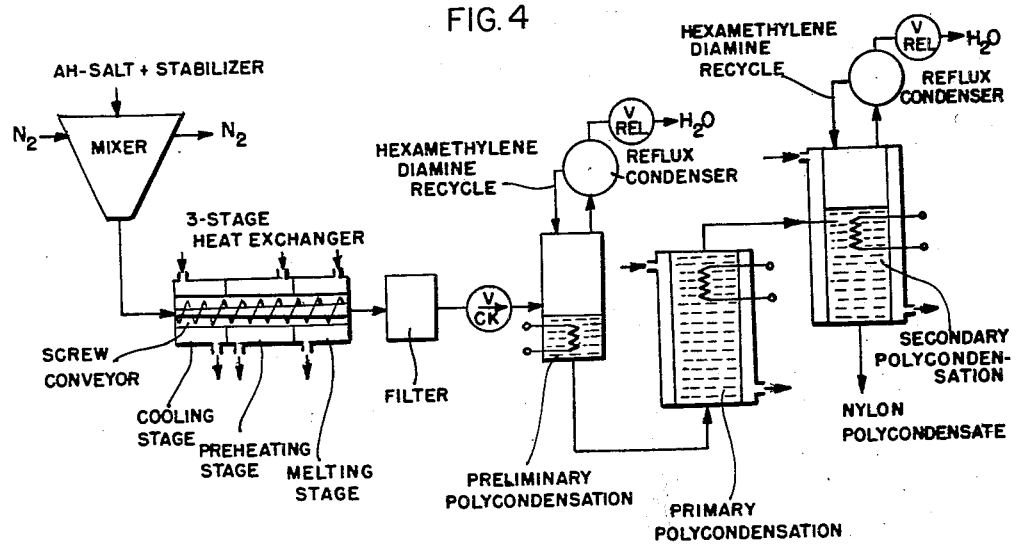

3,130,180
CONTINUOUS METHOD AND APPARATUS FOR THE PRODUCTION OF POLYHEXAMETHYLENE ADIPAMIDE
Fritz Wiloth, Klingenberg (Main), Germany, assignor to Vereinigte Glanzstoff-Fabriken A.G., Wuppertal-Elberfeld, Germany
Filed Nov. 3, 1958, Ser. No. 771,645
8 Claims. (Cl. 260—78)

This invention relates to an improved process and apparatus for the continuous production of a polyamide polycondensate. In particular, the invention provides apparatus and an improved continuous method for the polycondensation polymerization of precondensates from hexamethylenediammonium adipate making possible the use of solid, nondissolved initial substances.

Polyhexamethylene adipamide is a polyamide, more commonly referred to as "nylon" or "66 nylon." This polyamide is prepared from adipic acid and hexamethylene diamine by polycondensation polymerization, ordinarily to an average molecular weight of about 12,000 to 20,000 so that the polymer will be useful in forming filaments or fibers. In order to obtain the desired molecular weight, the polymerization process must be "stabilized." Stabilization can be accomplished by using a slight excess of one of the raw materials, i.e. adipic acid or hexamethylene diamine, but it is more common to add a small amount of some other suitable stabilizing compound which will ordinarily be a mono-functional reagent as compared to the bi-functional raw materials. It is now a customary practice to form the polyhexamethylene adipamide from hexamethylenediammonium adipate, sometimes referred to as "nylon salt" or "AH-salt." This nylon salt contains the two raw materials in equivalent quantities so that the addition of a stabilizing agent is especially desirable for controlling the polymerization.

It has previously been found that better results can be obtained when polymerizing polyamides from multi-functional raw materials, especially in the production of polyhexamethylene adipamide, if the raw materials are polymerized in solution rather than beginning with a solid material. For example, an aqueous solution of hexamethylenediammonium adipate has been preferred both in the discontinuous and continuous production of nylon. Ordinarily, the polycondensation polymerization is carried out with a nylon salt solution containing about 40 to 60% by weight of water.

On a small scale, it has been possible to produce nylon from hexamethylenediammonium adipate in its solid form. The solid nylon salt can be placed in an autoclave or similar pressure-tight vessel, the salt then melted and polycondensed and the split-off water removed from the vessel. However, even the discontinuous procedure is difficult to perform and difficult to control with respect to stabilization of the end product.

Thus, the nylon salt has an undesirable property of agglomerating into relatively large lumps or globules in which a mass of solid salt is surrounded by a molten layer. These lumps require very powerful stirring and a laborious mixing over an extended period of time to create a homogeneous molten mass. One reason for this is that the lumps having an outside molten layer present a very smooth surface which cannot be easily attacked by mechanical mixing devices. Furthermore, heat is not easily transferred to the solid material inside of the lumps so that melting proceeds very slowly. This latter effect is caused by the low conductivity of the material itself and also by the fact that a large amount of the heat supplied within the molten surface layer must be expended in the evaporation of water split off during polymerization.

Accordingly, it has been practically impossible to produce polyhexamethylene adipamide in a continuous process with the use of relatively large quantities of solid starting materials. On the other hand, by dissolving the nylon salt in an aqueous solution, a continuous process has hitherto been developed whereby it became easier to remove impurities by filtration, to remove and exclude air with its oxygen content, and to provide a simple introduction of a stabilizing agent. Air must be excluded in order to avoid a discoloration or charring of the polymer under reaction temperatures, and it has been common to employ any suitable inert atmosphere such as nitrogen or hydrogen.

Although the use of a nylon salt solution has certain advantages in a continuous process, certain disadvantages must also be accepted. For example, about 50 to 60% by weight of the solution employed in this method must be evaporated as water during the polymerization process. Relatively large apparatus is required for such evaporation and a considerable amount of additional energy must be expended to remove the water. Furthermore, the molten material must remain in the precondensation stage for an extended period of time, in order to complete the evaporation, thereby greatly reducing the effectiveness of any continuous procedure. Also, a vapor pressure of between about 16 and 20 atmospheres is customarily employed in order to reduce the melting point to a range of from 200 to 230° C. in the presence of water. As large amounts of evaporated water are discharged through a release valve, a quantity of hexamethylene diamine is unavoidably carried along with the vapors and cannot be recovered. The loss of hexamethylene diamine will, of course, increase substantially with the amount of water which must be evaporated.

When employing solutions, the evaporation of large quantities of water together with the unavoidable loss of hexamethylene diamine makes it very difficult to control the stabilization of the polymer. Stabilization is adversely affected when the equivalent quantities of hexamethylene diamine and adipic acid are imbalanced or disturbed, and unless these quantities can be accurately controlled, the polymerization is apt to proceed in an undesirable direction.

One object of the present invention is to provide a process and apparatus for the continuous production of polyhexamethylene adipamide in particular precondensates in which it is possible to employ the nylon salt in solid form and not in solution.

Another object of the invention is to provide a continuous process and apparatus for producing polyhexamethylene adipamide whereby stabilization of the polymerization reaction can be more carefully controlled.

Still another object of the invention is to provide a continuous production of nylon in which the evaporation of large quantities of water can be avoided and in which a lower cost for apparatus and energy requirements can be realized.

Another object of the invention is to prevent the loss of hexamethylene diamine during a continuous polycondensation polymerization.

Yet another object of the invention is to provide an improved method and apparatus for the purpose of easily mixing and rapidly melting a solid precondensate salt in the continuous production of nylon.

Still another object of the invention is to provide an improved process and apparatus for controlling the polycondensation of a molten hexamethylenediamine adipate and for removing the water split off during the reaction.

These and other objects and advantages of the invention will become more apparent upon a consideration of the following detailed disclosure taken in conjunction with the accompanying drawings wherein:

FIG. 1 is a partially schematic elevational view of one novel combination of apparatus employed in the continuous process of the invention;

FIG. 2 illustrates an alternative embodiment of the apparatus in which an additional component is added to that shown in FIG. 1;

FIG. 3 is a flow diagram in schematic form corresponding to FIG. 1 and further illustrating the process and apparatus of the invention; and FIG. 4 is another flow diagram corresponding to the embodiment shown in FIG. 2.

It has now been found in accordance with the invention that a very successful and improved continuous process for the production of polyhexamethylene adipamide from hexamethylenediammonium adipate can be obtained by employing the salt in its particulated solid form as a starting material. The improved continuous process requires that the solid precondensate salt be first introduced into a continuous screw conveying zone in which the salt is advanced with mixing and rapidly melted at an elevated temperature. Prior to introduction into the screw conveying zone, the particulated solid salt is preferably premixed with a suitable stabilizing agent.

In the screw conveying zone, it is especially advantageous to accomplish the mixing and melting in three successive stages such that the salt is first cooled or maintained at relatively low or room temperature, then preheating the salt to a temperature of above about 150° C. but lower than the melting point of the salt, e.g. 150–190° C., and finally rapidly melting the salt at a temperature of about 210° C. to 240° C. The melting of the salt must be carried out rapidly in order to avoid substantial polymerization prior to discharge of the molten material from the screw conveying zone.

As the molten material is discharged or extruded from the screw conveying zone, it is immediately passed into a separate reaction zone, preferably a vertical conduit or column such that the melt passes upwardly therethrough, for polycondensation polymerization at an elevated temperature and superatmospheric pressure. The melt is contained in the separate reaction or polymerization zone such that a vapor space is provided above a liquid level of the melt. Water split off during the polymerization rises into the vapor space above the heated surface of the melt and can be continuously removed from the reaction zone. It is especially advantageous to condense and return to the reaction zone those amounts of vaporized hexamethylene diamine which are in gaseous admixture with the water. The liquid nylon polycondensate, polyhexamethylene adipamide, is continuously withdrawn from the reaction zone at a point below the heated surface of the melt.

Apparatus which is essential to the invention includes a screw or worm conveyor for continuously advancing and melting the particulated solid salt, means to supply heat to the screw conveyor, a heated conduit or series of conduits in which the polycondensation polymerization can be carried out, means to withdraw vaporized water from a vapor space at the upper end of a conduit, and means to withdraw the polycondensate from a lower end of a conduit. The polymerization reaction is best carried out in at least two heated conduits or columns such that the molten material passes upwardly through a first heated column for primary polycondensation and then into a second heated conduit or column just below the surface of the melt in the second column. Polycondensation continues rapidly as water is removed from this heated surface and is substantially completed as the molten material is drawn downwardly in the secondary unit or conduit.

Additional heat is preferably supplied directly below the surface area of the molten material in order to continuously vaporize water into the vapor space above this surface area. The pressure in the reaction columns is kept constant by continuously bleeding off water vapor from the vapor space. By partial reflux or partial condensation of the vapors with suitable reflux or condensation means, hexamethylene diamine is condensed and returned to the molten material. The molten material passes downwardly in the second column so that the nylon polycondensate can be removed at the lower end.

It will be understood, of course, that the continuous process of the invention must be carried out in an oxygen-free atmosphere, i.e. in an enclosed or pressure-tight apparatus capable of excluding air. Also, means must be provided to first rinse the apparatus with an inert gas such as nitrogen before starting up the process, and it is preferable to continue the flow of nitrogen into or through the premixer during continuous operation.

If desired, the polymerized material or polycondensate can be further conducted by conventional means to a so-called "finisher," and such additional steps can be carried out in a familiar manner in conjunction with the continuous method of the invention. For example, the nylon precondensate can be extruded and cooled by known means in order to produce nylon crystals or chips as a bulk product in solid form. It is also contemplated that the molten nylon be conducted directly to spinning apparatus for the production of filaments.

The salt of adipic acid and hexamethylene diamine is hereinafter referred to as the "AH-salt." The polymerized product, polyhexamethylene diamine, is referred to as the "nylon polycondensate" or precondensate. Precondensates have molecular weights of less than 10,000.

Suitable well-known stabilizing agents for the polycondensation polymerization include acids, such as acetic, benzoic and adipic acids, or acid amides, such as adipic acid-bis-n-hexylamide. It is advantageous to select a stabilizing agent which can be easily mixed by mechanical means with the particulate solid AH-salt, either in the premixer or in a preceding step. Benzoic acid and/or adipic acid are especially preferred in the continuous method of the invention. The quantity of the additive or stabilizing agent depends upon the final degree of polymerization desired, molecular weights of at least 6,000 and usually more than 10,000 being required for most purposes. About 0.5 to 2 mol percent of the stabilizing agent, with reference to the AH-salt, will ordinarily be employed.

The continuous process of the invention is readily adapted to a wide range of operating conditions in order to obtain various molecular weight products. The important feature of the invention resides in the fact that the properties and quality of the product can be controlled very closely once equilibrium has been established in the continuous operation.

The following description of the invention is with reference to the specific embodiments illustrated by the drawings, but it will be understood that modifications in the process and alternative or equivalent apparatus can be provided by one skilled in the art within the spirit and scope of the invention. The apparatus is most completely explained in conjunction with FIGS. 1 and 2 while the process is described in the form of a specific example with reference to FIGS. 3 and 4.

In FIGS. 1 and 2, the apparatus shown is suitable for adjustment to a throughput of 200 grams AH-salt per minute. A predried, highest purity AH-salt is initially introduced through the feed nozzle 1 into the funnel or premixer 2 which is provided with a stirrer or rotary mixer 3. The AH-salt can be filled into the apparatus automatically in predetermined amounts by any suitable measuring and feeding device (not shown). Nitrogen is simultaneously blown into the premixer through line 4 and gas is discharged through valve 7 and line 4'. Since the AH-salt tends to form bridges and hollows or channels during the premixing operation, it has been found to be very advantageous to equip the stirring device 3 with a shovel-shaped tongue or arcuate flange 5 which rotates in a circular path adjacent the wall of the funnel or premixer 2 in a space directly over the screw conveyor 8. The funnel or premixer 2 is gas-tight, being enclosed by the cover or top 6 through which the feed nozzle 1 and nitrogen lines 4 and 4' are conducted.

Before starting up the continuous operation, the entire apparatus is rinsed with nitrogen or an equivalent inert gas while closing valve 7 in order to remove substantially all traces of oxygen. Then, as the premixer 2 is filled with AH-salt through the feed nozzle 1, the valve 7 remains closed. Subsequently, as the apparatus is placed in continuous operation, valve 7 can be opened and the premixer 2 rinsed with nitrogen as a continuous supply of AH-salt is introduced. The stabilizing agent, e.g. benzoic or adipic acid, can also be introduced into the premixer 2 but is preferably admixed with the AH-salt beforehand.

The solid and freely-flowing particulate salt is evenly discharged from the lower end of the funnel 2 into the screw or worm conveyor 8 and advanced by rotation of the worm with any conventional motor and drive shaft. The screw conveyor is preferably of the two-passage type as formed by two helical blades 8a and 8b with a uniform pitch of about 30°. The worm shaft or core 8c is advantageously increased in diameter in the conveying direction so as to place an increasing pressure upon the AH-salt as it passes through and is extruded by the worm. A compression ratio of about 1:1.6 to 1:2 is particularly advantageous for this purpose. The length of the worm or screw 8 is preferably about 15 to 20 times its diameter.

The screw conveying zone corresponding to the length of worm 8 can be divided into three separate stages in order to carefully control the mixing and melting of the AH-salt. Thus, with reference to FIGS. 3 and 4, the rear portion of the worm 8 including the portion in which the AH-salt is fed into the worm is water-cooled by indirect heat exchange in order to maintain a temperature of about 10 to 50° C. Following this cooling stage is a preheating stage maintained at a moderately elevated temperature of about 150 to 190° C. by indirect heat exchange. The melting stage is then located from at least about the middle to the front or forward portion of the worm. The length of this melting stage should be kept as short as possible and a very high supply of heat is very desirable. The temperature in the melting stage should lie between about 210 and 240° C. for optimum operation.

All three stages of the worm 8 can be supplied with heat (or water-cooled in the first stage) by means of any suitable heat exchange fluid passing around the outer casing of the worm. Cooling in the first stage prevents heat conduction backwardly along the worm to the feeding zone, and the preheating and melting stages serve to first uniformly raise the temperature during mixing of the AH-salt and then to rapidly melt the salt just before it is discharged or extruded for polycondensation. Since water does not escape readily from the worm conveyor, polycondensation is somewhat retarded upon melting the salt, and it is advisable to avoid substantial polycondensation at this point in the process.

An additional interior heating of the worm 8, particularly in the melting stage, is helpful to obtain rapid melting and a homogeneous molten reactant material. This interior heating can be easily accomplished by means of electrical heating elements situated within the core or shaft 8c with leads extending through the shaft to an outer connection. Rapid and uniform melting is insured by using both external heating and internal heating in the melting stage.

The diameter of the screw conveyor, the size of the passages or conveying space, and the rate of revolution of the shaft can be readily determined by one skilled in the art in order to convey a desired amount of material at a speed which will permit all of the salt to be liquefied. The worm conveyor essentially takes the place of the mixing and melting which can only be accomplished with great difficulty in batch or discontinuous operation. Also, the present invention permits a substantial separation between the melting and polycondensation stages in the overall process.

After the clear, highly fluid molten material leaves the screw conveyor 8, it is capable of undergoing rapid polycondensation. However, it is desirable to immediately conduct the flowing melt through an interchangeable filter or strainer 9 to remove any remaining impurities. The staying time during passage through the filter should be as short as possible. From the filter, the melt passes by way of valve 10 into a heated upright conduit, tube or column 12 wherein the primary polycondensation occurs. A valve 11 is employed for removing molten material when changing filters or is used in order to take samples. This transfer of molten material from the screw conveyor 8 to the column 12 can be carried out either directly against the pressure prevailing in the reaction vessel as shown in FIG. 1 or by the interposition of a rotary pump of the gear wheel type 23 as illustrated in FIG. 2. (This latter alternative embodiment is more fully discussed below.)

When using the simpler arrangement shown in FIG. 1, the screw or worm 8 is capable of exerting a sufficient exrtuding pressure to move the melt in a forward direction to the reaction zone, but the counter-pressure from the reaction zone requires a somewhat more extended melting stage and the use of a longer worm is then desirable. Therefore, the rotary pump or its equivalent is preferred to reduce the length of the worm and especially the melting stage therein.

An initial or primary condensation of the molten salt as shown in FIG. 1 is accomplished in the heated column 12, preferably so that most of the hexamethylene diamine is chemically bound in polymerized form, thereby greatly reducing the amount of this reactant which is capable of vaporizing with the split-off water. Thereby the reflux condenser 14 put on column 13, wherein molten material advances downwardly, is disengaged.

The lower portion of column 12 is preferably enlarged in order to stabilize the liquid flow therein and to achieve a sufficient staying time for a high degree of polycondensation at a sufficient distance from the surface area at 15. For example, the staying time can be about 12 minutes with respect to the above-mentioned throughput of 200 grams AH-salt per minute. Columns 12 and 13 are arranged so that the upwardly flowing melt in column 12 is introduced into column 13 just below the surface area 15 representing the liquid level of the melt. A vapor space is provided in the upper, enlarged portion of column 13 which is equipped with viewing or inspection glasses 16.

Water split-off during polycondensation emerges and is vaporized from the surface 15 together with small amounts of hexamethylene diamine, and the released vapors are conducted by way of the reflux collector or condensing column 14 which can be heated such that hexamethylene diamine will be condensed and returned to the melt while the water vapors are continuously removed through valve 17. After equilibrium has been established, this partial reflux or partial condensation permits a very accurate control upon polymerization stabilization. The bleed-off valve 17 can be automatically controlled by means of a manostat (not shown) in order to maintain a constant vapor pressure in column 13.

The nylon polycondensate flows downwardly in column 13 and is discharged through valve 18. The staying time of the molten material in column 13 can be about 20 minutes with reference to a 200 grams/minute throughput of AH-salt.

The polycondensation columns or vessels 12 and 13 can be heated together by indirect heat exchange to a temperature of about 250 to 270° C. Heated reaction columns equipped with means for indirect heat exchange, e.g. using a liquid or gaseous heat exchange medium, are quite common. It is more advantageous, however, to employ internal heating means, e.g. controllable electrical heating elements, particularly in the upper portion of column 12 and just below the surface 15 in column 13, since a large heat supply is necessary at these points for polycondensation and water evaporation. The vapor pressure or polycondensation zone pressure is preferably maintained between about 15 and 20 atmospheres. The optimum temperature and pressure for a particular degree of polymerization can be readily determined by a relatively few simple tests.

In FIGS. 2 and 4, an alternative arrangement of apparatus is illustrated wherein an additional column or conduit 20 is interposed after the screw conveyor 8 and between the filter 9 and column 12. The purpose of this arrangement is to provide a controlled pressure by means of valve 19, i.e. a pressure which is lower than that maintained in column 12, thereby permitting the molten material to flow against a smaller counter-pressure as it emerges from the screw conveyor 8. As noted above, the length of the worm or screw conveyor can thus be reduced with rapid melting in a smaller third stage of the conveyor.

In column 20, water vapor is evaporated from surface 24 and removed as in column 13, i.e. by a bleed-off valve 19, and hexamethylene diamine is condensed and returned to the molten material by the reflux collector or condensing column 21. The upper portion of column 20 is provided with two viewing or inspection glasses 22. A rotary gear-wheel type pump 23 is employed to transfer the molten material from the bottom of column 20 through valve 10 into the column 12 at a higher pressure. The check valve 25 acts to separate the polycondensation zone in column 20 from the screw conveying zone 8.

Column 20 is adapted to act only as a preliminary polycondensation zone, and the staying time of the molten material, especially at surface area 24, must be as short as possible since the evaporating water rapidly accelerates the polycondensation reaction with a danger of solidifying the molten material. This preliminary polycondensation zone is most advantageously operated at a pressure of about 5 to 10 atmospheres and a temperature of between about 220 to 240° C. Again, it is advantageous to use an internal electric heating element.

The invention is further illustrated by way of the following example in which specific operating conditions are given. The example is intended to be illustrative only and not exclusive.

*Example*

With reference to FIG. 3, very pure solid AH-salt particles admixed with 0.5 mol percent thereof of adipic acid as a stabilizer are continuously introduced into the pressure-tight mixer together with nitrogen rinsing. The throughput of the AH-salt is 200 grams/minute.

From the mixer, the particulated AH-salt is fed into a screw conveyor having a two-passage worm. The overall length of the screw conveyor is 76 cm. with a cooling stage of 13 cm. maintained at a temperature of 30° C., a preheating stage of 15 cm. maintained at a temperature of 190° C., and a melting stage of 35 cm. maintained at a temperature of 225° C. The blades of the worm are set at a 30° angle within a casing having a diameter of 4.5 cm. The core or shaft of the worm increases in diameter from 35 mm. at the feed end to 40 mm. at the discharge end to give a compression ratio of 1:2.

A homogeneous molten material is extruded from the conveyor through a filter and valve into a primary polycondensation column in which the molten material passes upwardly with a staying time of 12 minutes and within temperature limits of about 230° C. to 250° C. from bottom to top. The melt is then led into a secondary polycondensation column just below the surface or liquid level of the melt over which there is maintained a vapor space for water evaporation. The melt passes downwardly in the secondary column with a staying time of 20 minutes and a temperature of about 250° C. to 270° C. from the top to the bottom.

Evaporated water together with small amounts of hexamethylene diamine passes from the vapor space above the liquid level, the pressure being maintained at about 18 atmospheres, into the condenser operated at a temperature of 210° C. at the top such that the hexamethylene diamine is condensed and recycled to the melt in the secondary polycondensation column while vaporized water is bled off through a release valve. A very high quality nylon polycondensate with a molecular weight of about 4,000 is discharged from the bottom of the secondary column.

By introducing a preliminary polycondensation column as shown in FIG. 4, the above conditions can remain substantially the same except that the screw conveyor can be shortened to about 65 cm. with a melting stage of 25 cm. The preliminary polycondensation column can be operated at a temperature of about 230° C. and a pressure of about 8 atmospheres, with the addition of a pump to transfer the melt from this interposed column into the primary polycondensation column. The staying time of the melt in this first column is only about 120 seconds as the melt is transferred downwardly after being led from the conveyor and filter through a check valve. The condenser for this first column is operated in the same manner as the condenser in the third column in order to condense and recycle hexamethylene diamine and bleed off the vaporized water.

The process and apparatus of the invention are especially adapted to give a smooth and trouble-free continuous production of nylon from solid AH-salt. It is only necessary to vaporize and remove water which is split off during the polycondensation polymerization, thereby giving a considerable saving in time and energy as compared to that required for continuously treating a salt solution. When equilibrium has been reached in the continuous process of the invention, there is practically no loss of hexamethylene diamine and the polymerization reaction can be stabilized very accurately while the reaction itself can be controlled with very little supervision. In fact, the continuous process disclosed herein is well adapted to conventional automatic controls. In addition, the combination of apparatus is very flexible so as to permit the production of a wide range of high molecular weight products, not only with respect to nylon, but also as regards some of the similar polycondensate polyamides or polymers produced from solid starting materials.

The invention is hereby claimed as follows:

1. In a process for the production of polyhexamethylene adipamide from the nylon salt hexamethylene diammonium adipate as the initial reactant in the form of solid, nondissolved particles, an improved continuous method which comprises: introducing said particulated solid hexamethylene diammoniud adipate into a screw conveying zone in which the adipate is continuously advanced and rapidly melted at a temperature of about 210° C. to 240° C. before substantial polymerization; immediately passing the molten material into a separate, first-stage, liquid-phase reaction zone for continuous passage therethrough in the absence of a separate gas phase for polycondensation polymerization at a temperature of about 230° C. to 270° C. and at a pressure of about 15 to 20 atmospheres, the water split off during said polymerization flowing co-currently with said molten material through said first-stage reaction zone and the retention time of said molten material and water under the reaction conditions in said first-stage reaction zone being sufficient to chemically bind most of the hexamethylene diamine in polymerized form; continuously vaporizing and removing said water from a heated surface of the molten material in a gas space located at the end of said first-stage reaction zone and maintained under said polycondensation reaction pressure of about 15 to 20 atmospheres; and continuously withdrawing a liquid polycondensate having a modecular weight of at least about 4,000 at a point below said heated surface in a second-stage, liquid-phase reaction zone maintained at about 250° C. to 270° C. and under said pressure of about 15 to 20 atmospheres for further polycondensation after removal of said water.

2. The improved continuous method of claim 1 wherein the molten material is retained in said second-stage reaction zone for a period of time sufficient to produce a fiber-forming polycondensate with a molecular weight of more than 6,000.

3. The improved continuous method of claim 1 wherein a stabilizing agent for stabilization of the polymer molecular weight is introduced into said screw conveying zone in admixture with said particulated hexamethylene diammonium adipate.

4. The improved continuous method of claim 1 wherein said screw conveying zone is divided into three successive stages: (1) a first stage in which the hexamethylene diammonium adipate solid salt particles are cooled to a temperature of about 10° C. to 50° C.; (2) a second stage in which said particles are preheated to a temperature of about 150° C. to 190° C.; and (3) a third stage in which said particles are rapidly melted at a temperature of about 210° C. to 240° C.; increasing pressure in a compression ratio of approximately 1:1.6 to 1:2 being placed upon the material passing through said conveying zone.

5. The improved continuous method of claim 1 wherein the molten material is first conducted upwardly in said first-stage polycondensation reaction zone and then downwardly in said second-stage polycondensation reaction zone, vaporized water being removed from the gas space above the heated surface which corresponds to the liquid level of the molten material in said second-stage reaction zone.

6. The improved continuous method of claim 5 wherein the molten material in said first-stage reaction zone is introduced into said second-stage reaction zone at a point directly below and in the vicinity of said liquid level.

7. The improved continuous method of claim 5 wherein water is also continuously vaporized and removed from the molten material after it leaves said screw conveying zone and prior to its entry into said first-stage reaction zone at a temperature of between about 220° C. and 240° C. and under a pressure of about 5 to 10 atmospheres.

8. The improved continuous process of claim 1 wherein the retention time of the molten material and water in said first-stage reaction zone is sufficiently long under the reaction conditions such that the water is vaporized and removed from said heated surface only after essentially all of the hexamethylene diamine in the melt has been chemically bound in polymerized form, thereby preventing any loss of said hexamethylene diamine by vaporization and removal with the water.

References Cited in the file of this patent

UNITED STATES PATENTS

| | | |
|---|---|---|
| 2,163,636 | Spanagel | June 27, 1939 |
| 2,204,777 | Smith | June 18, 1940 |
| 2,361,717 | Taylor | Oct. 31, 1944 |
| 2,557,910 | Green | June 19, 1951 |
| 2,810,630 | Herele | Oct. 22, 1957 |
| 2,831,834 | Magat | Apr. 22, 1958 |
| 2,918,455 | Elrod et al. | Dec. 22, 1959 |
| 2,987,506 | Lum | June 6, 1961 |

FOREIGN PATENTS

| | | |
|---|---|---|
| 614,625 | Great Britain | Dec. 20, 1948 |
| 237,400 | Switzerland | Sept. 1, 1945 |
| 1,012,459 | Germany | July 18, 1957 |